A. J. PETERSON.
BUNDLE DELIVERING MECHANISM FOR THRESHING MACHINES.
APPLICATION FILED JUNE 12, 1914.
1,177,049.
Patented Mar. 28, 1916.
5 SHEETS—SHEET 1.
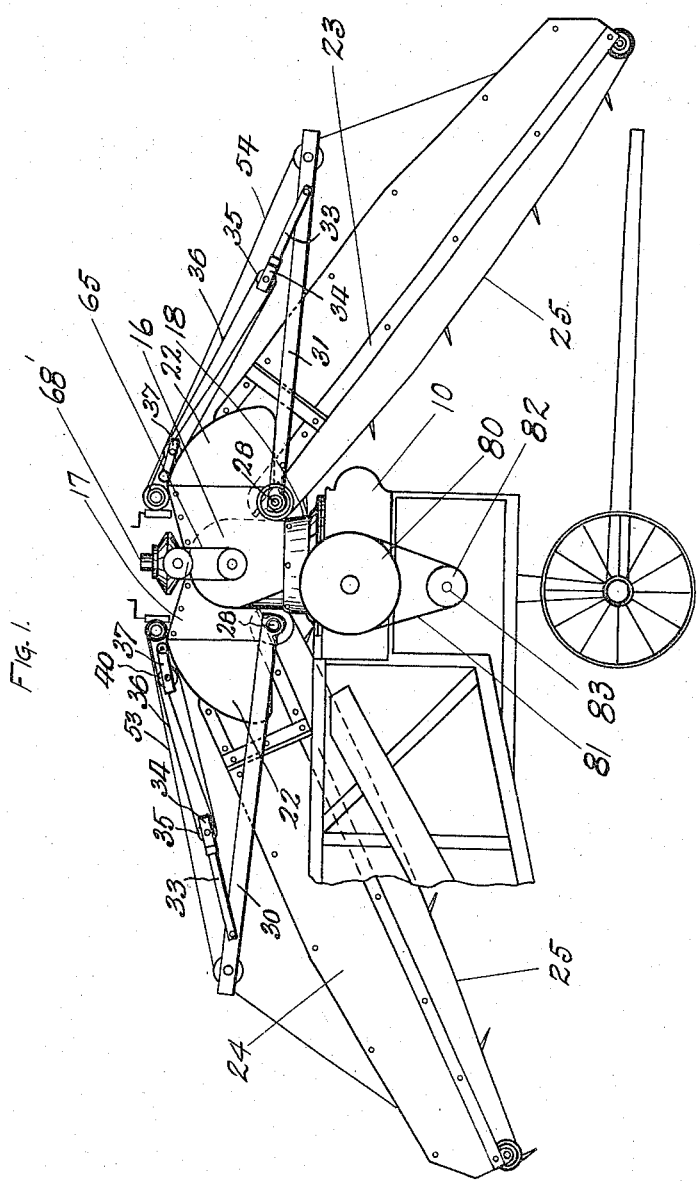
WITNESSES:
INVENTOR.
ANDREW J. PETERSON
BY
ATTORNEY A. J. PETERSON.
BUNDLE DELIVERING MECHANISM FOR THRESHING MACHINES.
APPLICATION FILED JUNE 12, 1914.
1,177,049.
Patented Mar. 28, 1916.
5 SHEETS—SHEET 2.
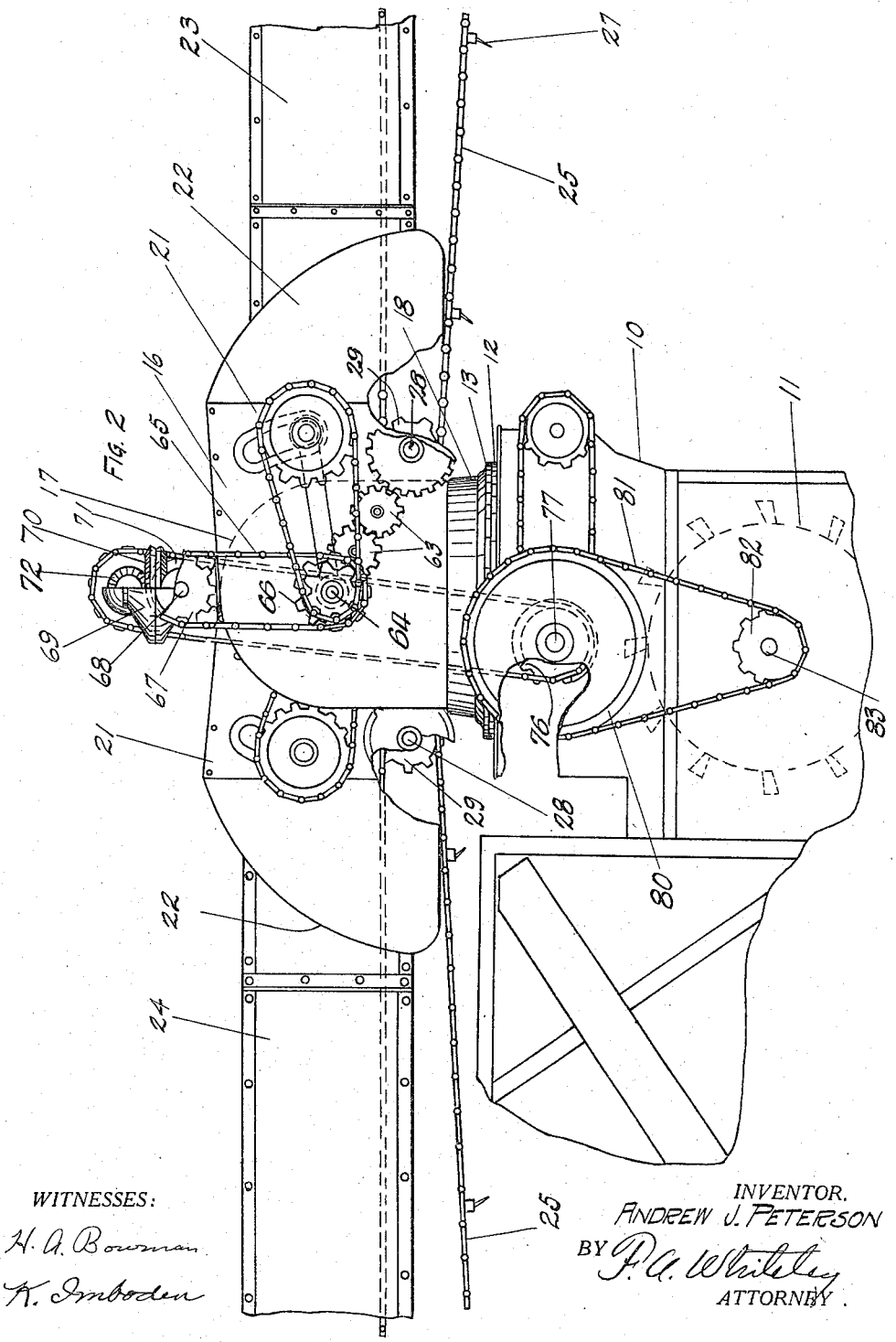
WITNESSES:
INVENTOR.
ANDREW J. PETERSON
BY
ATTORNEY.

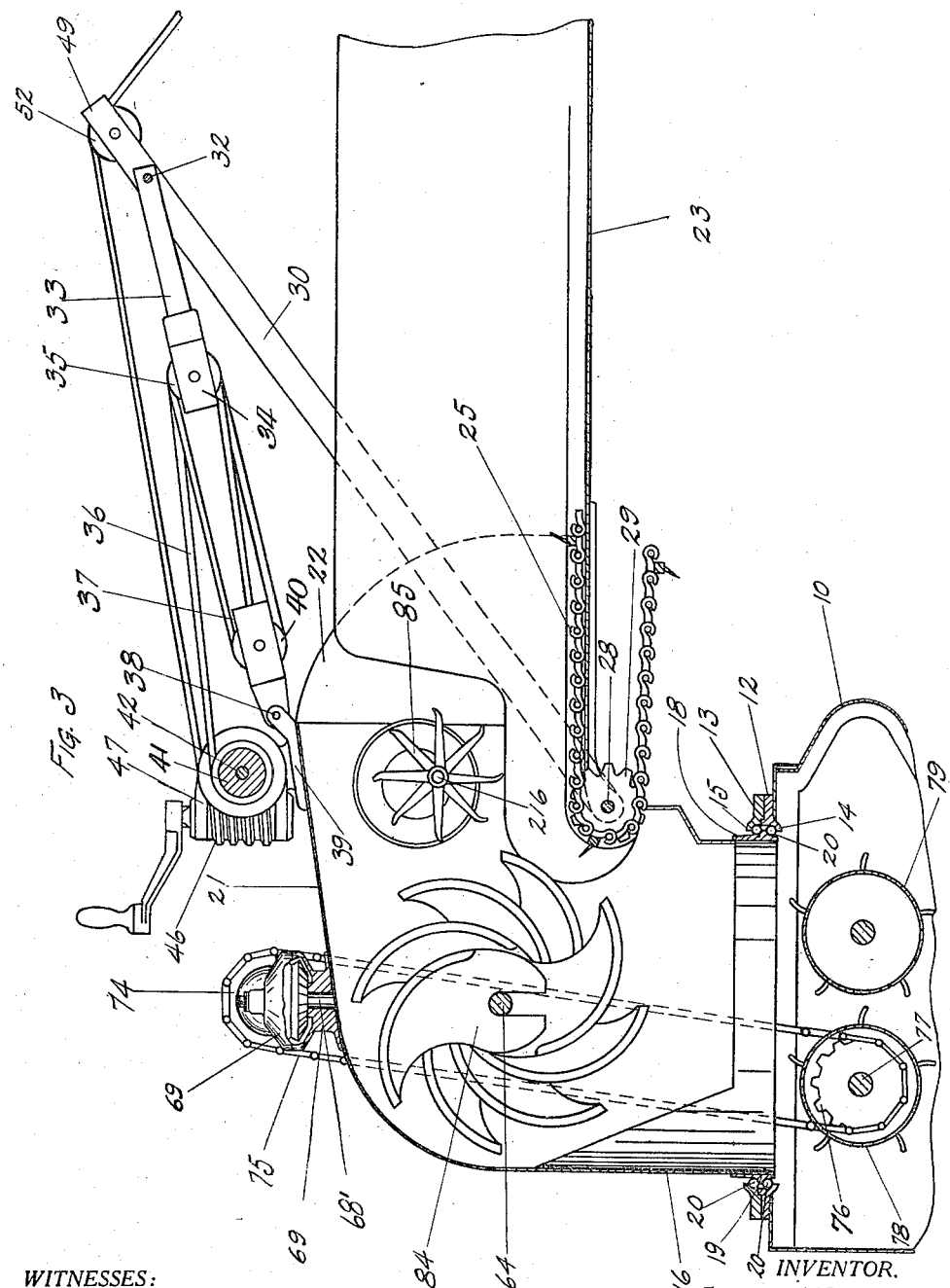

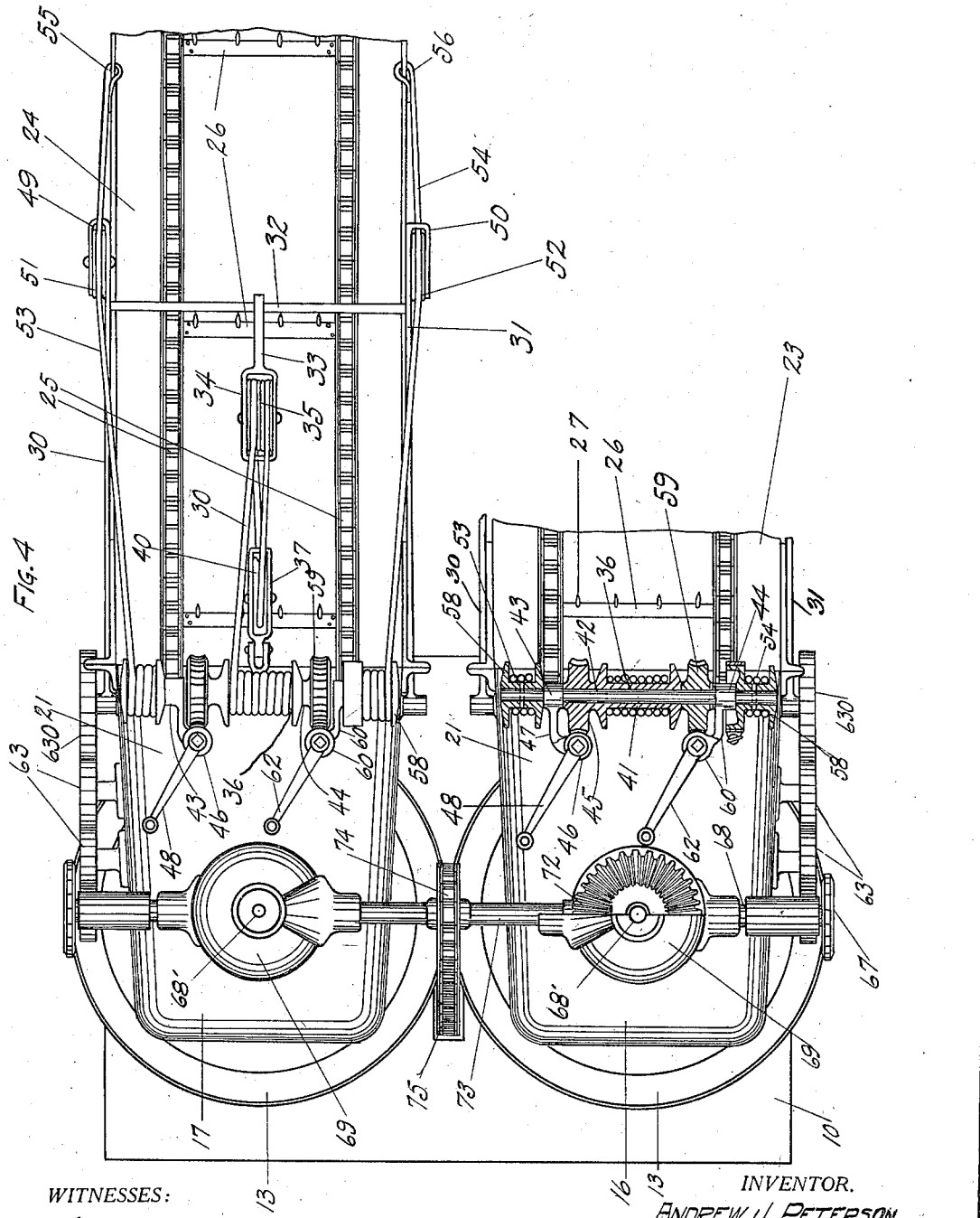

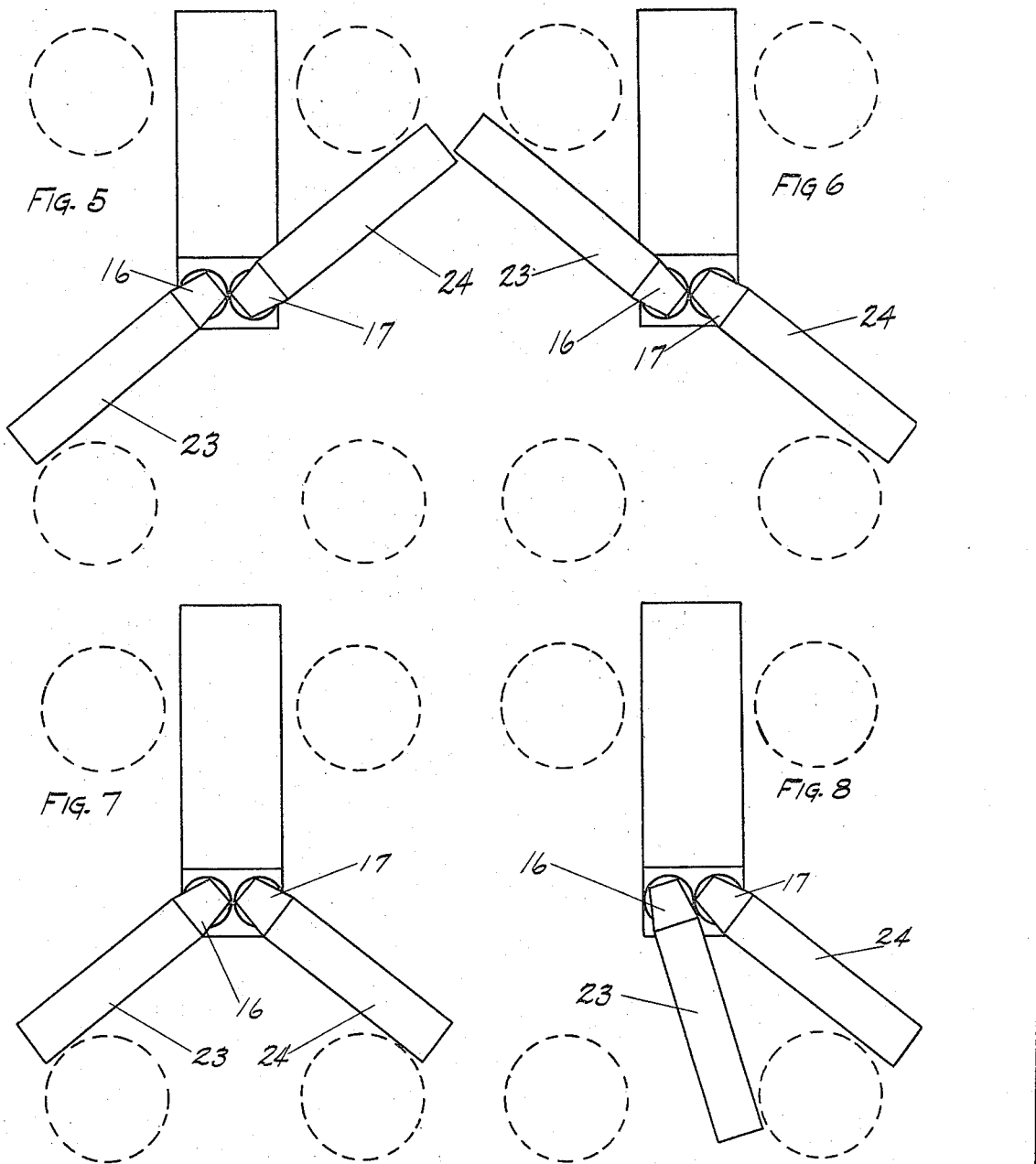

UNITED STATES PATENT OFFICE.

ANDREW J. PETERSON, OF ISANTI, MINNESOTA, ASSIGNOR TO TWIN CITY FEEDER MANUFACTURING COMPANY, OF MINNEAPOLIS, MINNESOTA, A CORPORATION.

BUNDLE-DELIVERING MECHANISM FOR THRESHING-MACHINES.

1,177,049.   Specification of Letters Patent.   Patented Mar. 28, 1916.

Application filed June 12, 1914. Serial No. 844,683.

*To all whom it may concern:*

Be it known that I, ANDREW J. PETERSON, a citizen of the United States, residing at Isanti, in the county of Isanti and State of Minnesota, have invented certain new and useful Improvements in Bundle-Delivering Mechanism for Threshing-Machines, of which the following is a specification.

My invention relates to bundle-delivery mechanism for threshing machines and has for its object to provide such a mechanism in which a pair of wing carriers are connected in such relation to the threshing cylinder and feeder mechanism of a threshing machine, that bundles conveyed by said carriers will be delivered to said feeder mechanism and threshing cylinder in exactly the same relative position regardless of the angle at which said carriers may be turned in respect to the separator, and whether turned to the front or rear. In accomplishing this object I provide means whereby the bundles are conveyed by the carrier mechanism and delivered to the feeder mechanism and threshing cylinder directly downward; that is, at the time of delivery the bundles are turned in a substantially vertical position so that the direction at which the carrier is turned, whether to the front or to the rear, can have no effect upon the manner in which the bundles go to the feeder and threshing cylinder.

It is also an object of my invention to provide a pair of such carriers so related to the threshing cylinder that the bundles conveyed by each carrier go to a portion only of the threshing cylinder, so as to be operated upon independently of bundles conveyed by the other carrier. The two carriers coöperate in producing a thoroughly efficient feed because one cannot introduce its bundles to the part of the cylinder operating upon bundles from the other carrier, and because this form of distribution insures the uniform operation of the entire threshing cylinder when bundles are conveyed from both carriers. The range of movement of the two carrier wings is so great that both carriers may always be employed in feeding the engine cylinder, even when there is only one stack to be threshed. Both carriers may be swung so as to feed from the same side of the machine. Each of the carriers has a range of movement for various feeding positions through more than one hundred and eighty degrees.

A further object of my invention is to provide novel and efficient means for controlling the carriers, to raise and lower the same, and effective means for driving the conveyers of the carriers throughout the range of swinging movement of the carrier wings.

The full objects and advantages of my invention will appear in connection with the detailed description thereof and are particularly pointed out in the claims.

In the drawings, illustrating the application of my invention in one form, Figure 1 is a side elevation of a portion of a threshing machine showing my bundle-conveying members applied thereto, the carriers being in working position when turned in opposite directions. Fig. 2 is a view of some of the parts shown in Fig. 1 on a somewhat larger scale showing some of the driving mechanism. Fig. 3 is a sectional elevation on an enlarged scale showing the relation of the carriers to the feeding mechanism and the means for controlling the elevation of the carriers. Fig. 4 is a plan view of the mechanism showing a portion only of the carriers and with some parts in section. Figs. 5 to 8 are diagrammatic representations of the separator showing different working positions of the carriers.

As illustrated, I provide a casing 10 which is adapted to be secured upon the front of the separator above the threshing cylinder, indicated in dotted lines at 11. Upon the top of casing 10 are secured two pairs of rings 12, 13 having flanged lips 14, 15, as best shown in Fig. 3. Each of a pair of hoods 16, 17, is provided with a cylindrical base ring 18 having a peripheral rib 19 journaled between ball bearings 20 positioned on either side of said rib and held by the lips 14, 15 of rings 12, 13. It will thus be apparent that the hoods 16 and 17, which rise vertically above the rings 18 and open throughout the circular area inside of said rings into the casing 10, are free to rotate in a horizontal plane upon said ball bearings. The hoods 16, 17, and the parts connected therewith, are identical in all particulars and, therefore, the respective parts for each hood will be referred to by the same reference characters.

Each of hoods 16 and 17 is provided with a forwardly-extending cap or cover 21 having side wings 22, said hoods opening outwardly between said wings. Between the wings, at the bottom parts of the hoods, are journaled carrier troughs 23, 24, respectively, and in these troughs run endless carriers 25 comprising spaced sprocket chains connected by carrier bars 26, preferably provided with pins or prongs 27. The carrier troughs 23, 24 are rigid laterally with the forwardly-extending portions 21 of the hoods 16, 17, so that they rotate freely therewith; but said troughs are journaled to oscillate in vertical planes on shafts 28. The shafts 28 have thereon sprocket wheels 29, which operate the carrier chains 25, power being communicated thereto in any position of said carriers, as will be later pointed out.

For controlling the elevation of the carriers 23 and 24 I provide the following mechanism: A fulcrum support is formed of bars 30, 31 pivotally secured at their lower ends to shaft 28 and connected adjacent their free upper ends by a crossbar 32. Upon the crossbar is pivotally supported an arm 33 terminating in a yoke 34, in which is journaled a compound pulley 35. A cable 36 has one end secured to a block 37 pivotally anchored at 38 to a casting 39 bolted to cover 21. The cable runs from the point of fastening about one member of pulley 35, about a pulley 40 in block 37, about the other of pulleys 35 to a drum 41 loose on a shaft 42, which is rotatably journaled in bearings, 43, 44 secured to casting 39. The drum 41 is fast with a sleeve extension carrying a worm wheel 45 meshing with a worm 46 journaled in bracket extensions 47 of bearing member 43. It will thus be apparent that the support consisting of bars 30, 31, and crossbar 32, is held in position by means of the block-and-tackle arrangement above described from drum 41, so that by operating the worm 46 by means of hand crank 48, the support may be readily raised or lowered, as desired. Extensions 49 and 50 of bars 30 and 31 have journaled therein pulleys 51 and 52. The carriers 23 and 24 are each directly supported by means of cables 53, 54, which are fastened at 55 and 56 to the sides of the carrier and run over pulleys 49 and 50 to drums 57 and 58 fast on shaft 42. The shaft 42 also has fast thereon a worm wheel 59 meshing with a worm 60 on a vertical shaft journaled in a bracket 61 extending from bearing casting 44, and having a crank 62 thereon. It will thus be apparent that the drum 36 and the drums 57, 58 may be independently operated, the one to raise or lower the support 30, 31, 32, and the other to raise and lower the carriers directly from said support, both of which operations have the effect of cumulatively swinging the carriers upon the shaft support 28. In this manner, the carriers may be raised and lowered with great facility and little effort.

The carrier chains are operated by turning of the shaft 28, which, as best shown in Fig. 2, is driven by gearing 63 from a short shaft 64 operated by a sprocket chain 65 running over a sprocket wheel 66 on shaft 64, and over a sprocket wheel 67 on a short shaft 68 journaled in a casing 69 upon the top of cover 21. Mounted upon a vertical shaft 68' in casing 69 is a double bevel gear 70, the lower bevel face of which meshes with a bevel gear 71 on shaft 68, while the upper face meshes with a bevel gear 72 on a shaft 73 journaled in both casings 69 and, therefore, held rigidly fixed with said casings. It is to be observed that the casing 69, as best shown in Fig. 3, is sectional, so that the portions thereof may move relatively, the lower portion being fixed in relation to the top 21 of hoods 16 and 17, while the upper portion is fixed in relation to the shaft 73. The carriers, therefore, are free to revolve about the axis formed by vertical shaft 68' while retaining driving connection with shaft 73. The shaft 73 has thereon midway between hoods 16 and 17 a sprocket wheel 74 operated by a sprocket chain 75, which, in turn, is driven by a sprocket wheel 76 on shaft 77, upon which is mounted one of a pair of feeder rollers 78, 79 within casing 10. The shaft 77 has thereon, outside of casing 10, a sprocket wheel 80 driven by a sprocket chain 81 from a sprocket wheel 82 extending from sprocket wheel 80 on a shaft 83 of the thresher cylinder. Band cutter mechanism 84, and feed governor mechanism 85 within hoods 16 and 17, are also driven from the above described means.

The feed rollers 78 and 79 extend directly across beneath the vertically downward discharge openings of hoods 16 and 17 and above the threshing cylinder indicated in dotted lines at 11. The discharge of rollers 78 and 79, if such rollers are used, and the portion of the threshing cylinder between the axis of the cylinder and the threshing concave are positioned beneath the center of the vertical discharge openings of the hoods 16 and 17. It will be apparent, therefore, that all bundles coming from a carrier 23 or 24 will drop downwardly off of the end of conveyer 25, and will pass between feed rollers 78 and 79 to the threshing cylinder, or directly to the threshing cylinder, in the same relative position with respect to the threshing cylinder whatever may be the angle of the carriers 23 and 24 with respect to the axis of the threshing cylinder. It will therefore be apparent that each carrier delivers its bundles to a particular portion of the threshing cylinder and that the delivery of bundles by one carrier cannot overlap upon that of the other carrier, so that the feed from the two carriers results in uniformity of grain delivery across the entire length of the threshing cylinder and the carriers cannot pile up the bundles at one part only of the threshing cylinder so as to cause slugging and inequality of work.

I claim:

1. An attachment for threshing machines comprising a pair of hoods having substantially cylindrical passageways therein opening vertically downward above portions of the threshing cylinder at each side of the transverse center thereof, said hoods being freely rotatable about vertical axes, and means for conveying bundles from a point removed from said hoods and delivering them into the passageways of said hoods at a point sufficiently far above the threshing cylinder so that said bundles will descend thereto vertically along the longitudinal axes of the bundles, being delivered in the same relative position with respect to the threshing cylinder for every possible position of the conveying means relative to said cylinder.

2. An attachment for threshing machines comprising a pair of hoods having substantially cylindrical passageways therein opening vertically downward above portions of the threshing cylinder at each side of the transverse center thereof, said hoods being freely rotatable about vertical axes, a conveyer pivotally connected to each hood to swing in a vertical plane and discharge bundles within said passageways at a point sufficiently far above the threshing cylinder so that said bundles will descend thereto vertically along the longitudinal axes of the bundles, being delivered in the same relative position with respect to the threshing cylinder for every possible position of the conveyers relative to said cylinder.

3. An attachment for threshing machines comprising a pair of hoods having substantially cylindrical passageways therein opening vertically downward above portions of the threshing cylinder at each side of the transverse center thereof, said hoods being freely rotatable about vertical axes, a carrier trough pivotally connected to each hood to swing in a vertical plane, endless carriers operative in said carrier troughs to discharge bundles within the hood whence said bundles will descend vertically through said openings to said respective portions of the threshing cylinder, a driven shaft mounted upon both hoods and held fixed in relation to the body of the threshing machine, and means on each hood and movable therewith having operative connection with the driven shaft for driving said endless carriers when the hoods and the carrier troughs are in any position relative to the axis of the threshing cylinder.

4. An attachment for threshing machines comprising a pair of hoods mounted upon the front of the threshing machine and each having substantially cylindrical passageways therein opening vertically downward above the respective end half-portions of the threshing cylinder, a wing conveyer pivotally connected to each hood to swing about the horizontal axis and discharge bundles within the hood whence said bundles will descend vertically through said opening to the threshing cylinder, said hoods being freely rotatable about vertical axes to position the wings at any angle along the sides and in front of the threshing machine, both wings being operable in front of the threshing machine at either side of the side planes thereof, the vertical openings of said hoods being so related to the end-portions of the threshing cylinder that bundles from each hood will be delivered only to the end-portion of the cylinder beneath its opening and all of the bundles will be delivered vertically along the longitudinal axes thereof in the same relative position with respect to the threshing cylinder for every possible position of the conveyers relative to said cylinder.

5. An attachment for threshing machines comprising a pair of hoods having substantially cylindrical passageways therein opening vertically downward above portions of the threshing cylinder at each side of the transverse center thereof, said hoods being freely rotatable about vertical axes, a carrier trough pivotally connected to each hood to swing in a vertical plane, endless carriers operative in said carrier troughs to discharge bundles within the hood whence said bundles will descend vertically through said openings to said respective portions of the threshing cylinder, a shaft mounted upon both hoods and held fixed in the plane of the axes thereof, means for driving said shaft from the threshing cylinder including a sprocket chain and a sprocket wheel on the shaft midway between the two hoods, and means on each hood and movable therewith having operative connection with said shaft throughout the range of movement of said hoods for driving said endless carriers when the hoods and the carrier troughs are in any position relative to the axis of the threshing cylinder.

In testimony whereof I affix my signature in presence of two witnesses.

ANDREW J. PETERSON.

Witnesses:
W. LANDY,
H. A. BOWMAN.